United States Patent [19]

Hyde

[11] Patent Number: 4,535,548

[45] Date of Patent: Aug. 20, 1985

[54] METHOD AND MEANS FOR DRYING COATINGS ON HEAT SENSITIVE MATERIALS

[75] Inventor: James L. Hyde, Palos Verdes Estates, Calif.

[73] Assignee: Discovision Associates, Costa Mesa, Calif.

[21] Appl. No.: 436,213

[22] Filed: Oct. 25, 1982

[51] Int. Cl.³ .............................................. F26B 3/30
[52] U.S. Cl. ........................................... 34/4; 34/13; 34/39; 34/66; 34/68; 118/642; 118/643; 427/55; 427/208.2; 427/374.3
[58] Field of Search ...................... 34/4, 13, 66, 31, 39, 34/68, 216; 118/66, 69, 642, 643; 427/55, 208.2, 374.3; 430/8

[56] References Cited

U.S. PATENT DOCUMENTS

| | | | |
|---|---|---|---|
| 3,900,959 | 8/1975 | Breschi et al. | 34/155 |
| 3,994,073 | 11/1976 | Lackore | 34/4 |
| 4,214,015 | 7/1980 | Stephan | 427/374.3 |
| 4,313,190 | 1/1982 | Slaten | 369/275 |
| 4,336,279 | 6/1982 | Metzger | 118/642 |
| 4,416,068 | 11/1983 | Nilsson et al. | 34/4 |

Primary Examiner—Larry I. Schwartz
Assistant Examiner—David W. Westphal
Attorney, Agent, or Firm—Ronald J. Clark

[57] ABSTRACT

A method and means for drying a thin aqueous-based coating on heat sensitive materials without boiling and without distortion or damage to the heat sensitive material or delicate surface thereof. Solvent-based adhesives are used in the production of articles of manufacture because of the ability to assembly the separate pieces immediately after the spray adhesive is applied. However, certain solvent-based adhesives attack the surface of the item to be covered, and in the case of videodiscs, the solvent in the adhesive may well contaminate the plastic surfaces or even the aluminum reflective layer of a laser disc. According to the present invention, a water based coating applied to a sensitive material is subjected to alternate sources of radiant heat energy and relatively cool air. The time of exposure to each source and the amounts of heating and cooling of the respective sources are maintained at levels sufficient to significantly decrease the time needed to dry the coating while limiting the temperature increase of the material to a level insufficient to deform or distort the material or surfaces thereof.

2 Claims, 5 Drawing Figures

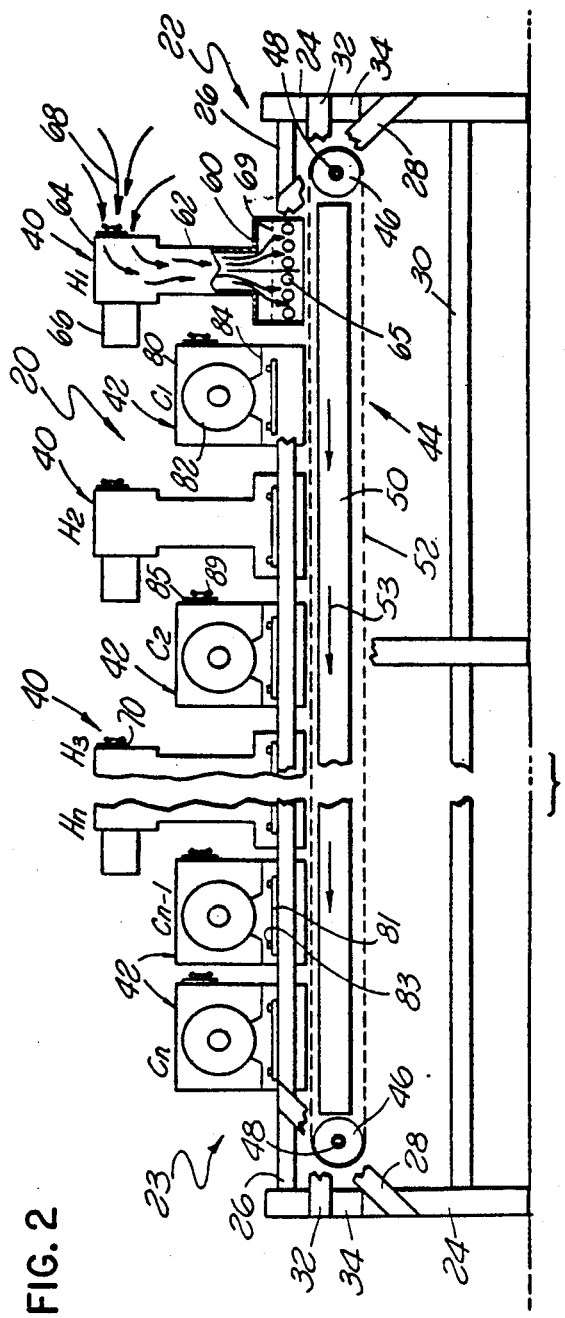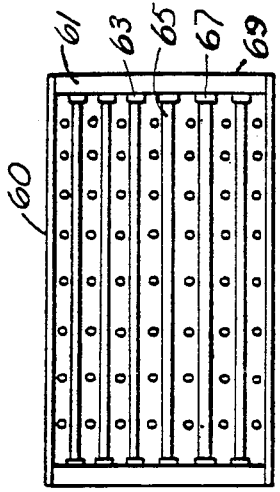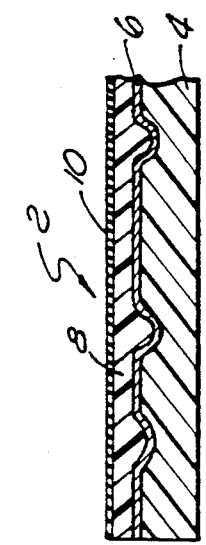

METHOD AND MEANS FOR DRYING COATINGS ON HEAT SENSITIVE MATERIALS

BACKGROUND OF THE DISCLOSURE

1. Field of the Invention

This invention relates to the field of drying thin coatings on materials, and more particularly to a method and means for drying a thin aqueous-based coating on heat sensitive materials without boiling and without distortion or damage to the heat sensitive material or delicate surface thereof.

2. Brief Description of the Prior Art

In the process of drying thin coatings deposited on articles of manufacture, several problems are encountered. In particular, the coating to be applied to an article is generally selected for certain important characteristics, such as being inert to the material upon which it is being deposited, making a good bond with the material, the absence of hazardous vapor produced in the evaporation of the liquid base of the coating, and immunity to distortion or deformation of the article or the surface thereof during the drying process. In a high production process, the drying of "wet" coatings is accellerated by the provision of heating devices to raise the temperature of the coating and therefore reduce the time necessary for drying the coating. Although such problems as just enumerated, and the solutions to such problems, are applicable to a variety of coated articles of manufacture, the background information and description portion of this application will be concerned primarily with the drying of coatings on flat surfaces, although the principles of the invention may be applied to the drying of coatings on any type of material, especially those materials sensitive to heat.

In the production of videodiscs, typically two disc halves (each disc half referred to as a 1X disc) are bonded together by an adhesive. The two sided (2X) discs are assembled by applying a light spray of solvent-based adhesive onto one or both inner surfaces of the 1X discs, and the two 1X discs are then assembled by using an assembly plate with a center hole aligning guide. The assembled discs are then pressed together using either a platen press or a rotary press. After the discs are so assembled, they are routed to an edging and cleaning station for smoothing the periphery of the disc and cleaning the playing surfaces.

An example of prior art method and means for bonding two 1X videodiscs together can be found by a reference to U.S. Pat. No. 4,313,190, issued Jan. 26, 1982 to Gary G. Slaten and assigned to the assignee of the present invention. In that U.S. Patent, the bonding material, typical in the art, is Pliobond manufactured by the Goodyear Company. Pliobond is a stable colloidal dispersion of Neoprene Type AH in an aliphatic solvent such as heptane.

Solvent-based adhesives are used in the production of videodiscs because of the ability to assemble the 1X discs immediately after the spray adhesive is applied. However, the consequences of using a solvent-based adhesive are many. Probably the most important ones lie in the fact that certain solvent-based adhesives attack the surface of the item to be covered, and in the case of videodiscs, the solvent in the adhesive may well contaminate the plastic surfaces or even the aluminum reflective layer of a laser disc. Such attacks on the information bearing surfaces of a videodisc can, of course, be catastrophic, necessitating the choosing of a bonding adhesive which will provide a strong bond and yet not interact chemically or physically with the surface of the article being coated. Other disadvantages of using solvent-based adhesives, are, relative to other coatings such as aqueous-based coatings, high cost, hazardous and unhealthy vapor products, the nuisance of excessive waste on parts of the disc handling apparatus during and subsequent to applying the adhesive, and time consuming and expensive clean up operations.

An alternate to solvent-based adhesives is, of course, water based adhesives, but this choice would be immediately dismissed by one skilled in the art due to the excessive drying time needed, and this disadvantage would be particularly prohibitive in high production environments.

Accordingly, there is a need in the art for developing a coating application and drying process in which the above-enumerated disadvantages of using solvent-based coatings are avoided and the excessive drying time for water-based coatings is eliminated. Water-based adhesives are used in woodworking (laminating) processes where the production rate is small, where the substrate is not heat sensitive, and where boiling may not be a problem. In such a case, the adhesive may merely be allowed to dry for several hours at room temperature, an infrared lamp may be used to accelerate the drying of the coating, or the coated substrate can be inserted into a hot air oven or otherwise exposed to a mass of hot moving air. However, it has heretofore been unknown how to use and gain the benefits of a water based adhesive in regard to the production of videodiscs and yet avoid the extensive drying times prohibitive for high volume production. The present invention satisfies this need.

SUMMARY OF THE INVENTION

The present invention overcomes the disadvantages and shortcomings of the prior art methods noted above by providing an improved method and means for drying coatings on heat sensitive materials. The coated heat sensitive material is subjected to alternate sources of radiant heat energy and relatively cool air. The time of exposure to each source and the amounts of heating and cooling of the respective sources are maintained at levels sufficient to significantly decrease the time needed to dry the coating while limiting the temperature increase of the material to a level insufficient to deform or distort the material or surfaces thereof.

More specifically, according to the invention, a water based adhesive can be used in a sensitive manufacturing process (e.g. in the process of manufacturing videodiscs) yielding high volume production and avoiding the disadvantages of using a solvent-based adhesive.

In a preferred embodiment of the invention, the radiant heat energy source is one of thermal radiation of wavelength longer than that of visible light, e.g. infrared radiation. For example, the heating source may be comprised of a multiplicity of heating elements such as high intensity infrared heat tubes arranged to produce energy levels of 60 to 160 watts per square inch of dryable substrate. The alternate cooling sources may be comprised of cooling elements such as cold air blowers employed, in alternate sequence with the heating sources, along a continuously moving conveyor belt arrangement. In order to maintain the proper amounts of heating and cooling, provisions are made to regulate the amount of air intake to the heating and cooling air sources, to vary the speed of the driven air blower, and for controlling the amount of electrical energy applied to the infrared heating elements. In a typical arrangement, the invention is adapted to dry an aqueous coating, especially an adhesive more than 0.002 in. thick, in less than one minute after application to a heat-sensitive substrate such as thin thermoplastic material (PMMA or PVC), without boiling of the adhesive and without distortion or deformation to the heat sensitive material or delicate surfaces thereof.

By employing alternate radiation heating and moving air cooling stations, the coating on the coated material, being located between the heat-sensitive substrate and the heat and cool air sources, receives direct radiant heat energy at its outer exposed surface, and heat begins immediately to penetrate the thickness of the coating. If allowed to penetrate through the coating and into the substrate below, the coating would advantageously dry quickly, but the heat-sensitive substrate may be irreversibly damaged. Accordingly, after being subjected to the radiant heat for a prescribed time and at a prescribed level, the cool air station cools the surface for a preset time and level of cooling, after which a subsequent radiant heat source is effective to again heat the coating, and the next cooling station again cools it, the heating and cooling stations operating in cyclical fashion.

BRIEF DESCRIPTION OF THE DRAWINGS

Other advantages of the invention and details of its operation can be further appreciated by reference to the attached drawings in which:

FIG. 1 is a partial cross sectional view of a 1X disc having a thin coating to be dried using the concepts of the present invention;

FIG. 2 is a side elevational view of the alternate heating and cooling stations according to the present invention;

FIG. 4 is a view of the bottom of one of the heat source stations shown in FIG. 2.

DETAILED DESCRIPTION OF THE PREFERRED EMBODIMENTS

Figure 3:
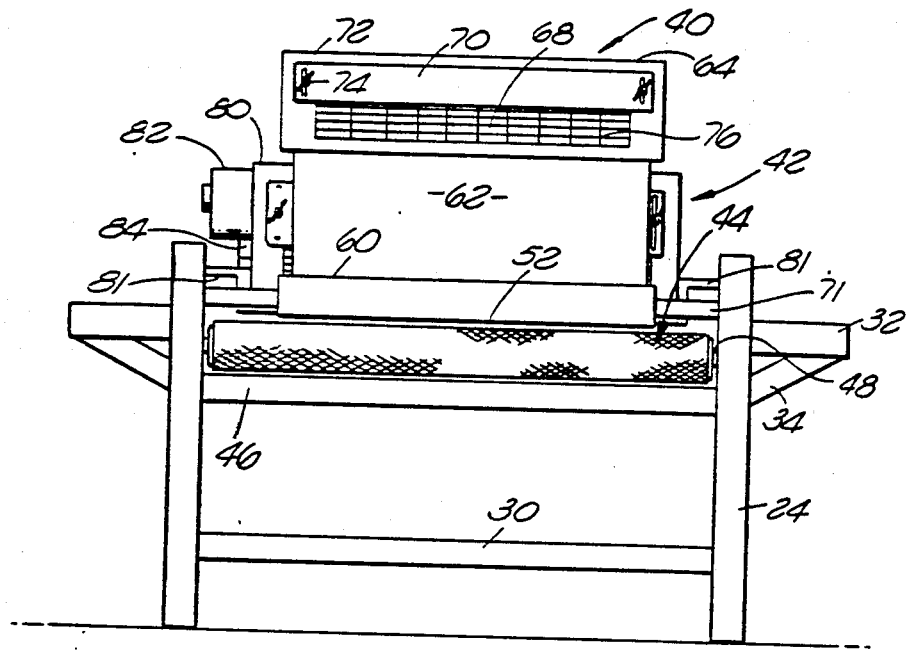
FIG. 3 is an end view of the arrangement shown in FIG. 2.

Although the preferred embodiment of the invention pertains to drying coatings on 1X videodiscs, the concepts of the invention can be applied equally well to other coated articles, and it should be understood that the illustrative use of the invention in connection with videodiscs is exemplary and not exclusive.

FIG. 1 shows, in partial cross section, a 1X videodisc 2 having a relatively thick plastic substrate 4 an aluminized reflective layer 6, a plastic protective layer 8, and a top adhesive layer 10. When bonded to an identical 1X disc (inverted from that shown in FIG. 1), a double sided videodisc results. The embodiment of the invention to be described is employed in drying the upper layer 10 of a 1X disc prior to its assembly into a 2X, or completed, videodisc.

As mentioned earlier, the solvent in solvent-based adhesives can penetrate the protective layer 8, and even attack the aluminum reflective layer 6. Since layer 6 and the adjacent surface of substrate 4 are the information-containing portions of the videodisc, any contamination thereof by the solvent would be catastrophic rendering a useless product.

Water based adhesives, on the other hand, are quite inert to most plastic materials such as that used in protective layer 8, and it is only necessary to accelerate the drying time for such adhesives in order to render them useful in a high production volume environment.

For drying of the coating 10, the coated videodisc 2 is placed at the entrance end 22 of the drying apparatus 20 of FIG. 2. The drying apparatus 20 is supported on a frame arrangement made up of a plurality of supporting legs 24, major support beam 26, braces 28, lower support beam 30, upper support beam 32, and angled supports 34. Any construction method which will support the functional parts of the invention yet to be described can be used, and no further details of the construction of the framework for the drying apparatus will be given.

A plurality of radiant heat energy sources 40 alternate along the framework of apparatus 20 with sources 42 of cooling air. The cooling air sources 42 force room temperature air over the coated article as it passes by the cooling station. The coated material is transported on a conveyor belt assembly 44 comprised of a pair of conveyor rollers 46 rotatably mounted on roller shaft 48. A perforated metal conveyor belt support 50 supports the moving conveyor belt 52.

The conveyor belt 52 is preferably perforated for the same reason as the top surface of support 50, and is advantageously made of ¼ in. mesh teflon belt material. In the example shown in FIG. 2, the direction of movement of conveyor belt 52 is shown by arrows 53.

A side view of one of the heating sources 40 with the internal construction of the heating compartment 60 schematically represented can be seen in FIG. 2, while the view of the same heating source as viewed from the left in FIG. 2 can be seen in FIG. 3. Each heating source 40 comprises a heating compartment 60, an interconnecting riser stack 62, a blower housing 64, and a blower motor 66. Intake air enters through air intake port 68 covered by a grating 76 and an adjustable cover plate 70. As best seen in FIG. 3, cover plate 70 is adjustable to partially cover the intake port and thereby act as an adjustable throttle for regulating the amount of air intake. Slot 72 and fastener 74 are provided on cover plate 70 for securing it to the face of the blower 64 after adjustment. Air passing through port 68, shown by the downwardly directed arrows in FIG. 2, pass through the riser stack 62, through a perforated plate 69, and between a parallel arrangement of infrared heat tubes 65. A bottom view of the heating compartment 60 is illustrated in FIG. 4 which shows mounting strips 61 along which are spaced sockets 63 for mounting elongated infrared radiant heat tubes 65. The perforations 67 in perforated plate 69 distribute the air flowing through plate 69 uniformly and at a constant rate.

For drying videodiscs of approximately 12 inches in diameter, a typical heat source 40 has a heat compartment 60 of 18 inches measured crosswise of the conveyor belt, each unit containing six infrared tubes, 8000 watts maximum per group of six tubes. Suitable tubes may be selected from a series of quartz infrared tubes made by Westinghouse. The air flow through the heat source 40 provides cooling air for the infrared tubes for extending the life and reliability of operation thereof while simultaneously adding some convectional heating action to the coated material in addition to the irradiated heat. It has been found that, for a heating source 40 containing six infrared tubes of the type described, an optimum passage of air through a 0.25 square foot restricted opening is approximately eight feet per second.

This amounts to approximately 120 CFM and can be realized with a 1/20 HP motor. In FIG. 2, a series of alternate heating and cooling stations is shown, the heating sources designated $H_1$ through $H_n$, while the cooling sources are identified as $C_1$ through $C_n$.

Each cooling source 42 comprises a housing 80, blower motor 82, and air ducting 84. Each cooling source may be provided, if desired, at its lower end with a perforated plate 69 of the same type as shown in FIG. 4, absent the infrared tubes, of course. The opening at the bottom of the housing 80 is preferably on the order of 0.63 sq. ft. with the blower providing approximately 18 feet per second of air movement. This amounts to approximately 680 CFM and can be realized using a 1/20th HP motor.

Figure 5:
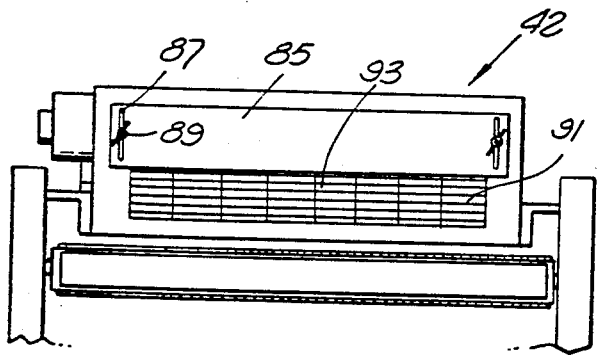
FIG. 5 is a view of the intake side of one of the cooling air stations shown in FIG. 2.

As with the heating sources 40, cooling air sources 42 may advantageously be provided with intake throttling as shown in FIG. 5. The adjustments for regulating air intake of cooling sources 42 is comparable to that described in connection with the same function of the heating sources, and reference is made to FIG. 5 showing cover plate 85, slot 87, fastener 89, grating 91, and air intake port 93 which have comparable functions to the corresponding elements described earlier for the heating source.

At each heating source, the upper surface of coating 10 is radiated with heat energy, and a large temperature gradient is established in the coated article, and heat transfer through the coating 10 and into the plastic layer 8 is thus to be expected. However, before the heat is transferred through the coating and into the article to any great extent, the coated article passes through the next station, which is, alternately, a cooling station, i.e. cooling air source 42. The temperature gradient at the upper surface of the article is immediately reduced by the effects of the cooling air, and the full impact of the irradiated heat from the prior heat source is, on the average, mitigated insofar as the structural parts of the article beneath the coating 10 are concerned.

The cooled article then passes under, and is affected by, the next heating station, i.e. heat source 40 designated $H_2$, and the upper surface of the coating 10 is again radiated with heat energy in the same manner as heretofore described. After leaving each heat source 40, a large temperature gradient is set up, and the drying effects on the coating 10 are operative. However, before the heat is transferred through the body of the coated article, the subsequent cooling station is effective to lower the temperature of the entire body to extinguish any degrading effects the radiant heat would have on the inner layers of the coated article. In the production of videodiscs, it has been found that an optimum number of heating/cooling pairs is six, i.e. six heating sources alternated with six cooling sources, the first source the article being subjected to being a heat source. Since heat is accumulated throughout the process, but still maintained well below the temperature at which any distortion or deformation of the article would take place, in order to return the article (e.g. videodisc) to approximately room temperature or handling temperature, an additional cooling unit $C_n$ is provided at the exit end 23 of the drying apparatus.

Each heating and cooling source may be provided with a laterally extending bracket 81 which can be secured to upper support rail 26 by bolts 83 (FIG. 2), although any other reliable mounting arrangement would clearly be acceptable.

A method and apparatus have therefore been described which effectively makes use of a unique drying apparatus arrangement in which alternate radiant heat energy sources and cooling air sources can accelerate the drying rate of an aqueous coating consistent with high volume production requirements and without the disadvantages associated with solvent-based adhesives. Although not shown in the drawings, an appropriate exhaust system can be provided in the manner of an overall housing for the apparatus 20 with air removal capacity equalling the sum of the air flow through the plurality of heating and cooling sources. Additionally, when the apparatus is used for such delicate articles as 1X videodiscs coated with an aqueous adhesive, cleanliness of the air bombarding the upper surface of the adhesive layer is of paramount importance. Accordingly, the intake air supply to each heat and cooling air source may be filtered through appropriate filter modules of known type and design. An example of the adhesive used in the process of preparing 1X coated discs is a product by National Adhesives called Panelmaster 72-6627 which is a water-based contact adhesive.

In a typical arrangement for drying the adhesive coatings on 1X videodiscs, the discs are automatically passed on the $\frac{1}{4}$ in. mesh belt 52 at 12 ft. per minute beneath the series of high intensity infrared lab dryers with interstage cooling from the alternately arranged air blowers 42. A blue dye by DuPont may also be added to the adhesive to absorb more of the infrared light in order to dry the adhesive and to not heat the disc substrates.

While the invention has been particularly shown and described with reference to a preferred embodiment and alterations thereto, it should be understood by those skilled in the art that various changes in form and detail may be made therein without departing from the spirit and scope of the invention.

I claim:

1. A method for drying coatings on heat sensitive materials, comprising the steps of:
    subjecting the coated heat sensitive material to alternate sources of radiant heat energy and relatively cool air; and
    maintaining the time of exposure to each source and the amounts of heating and cooling of the respective sources at levels sufficient to significantly decrease the time needed to dry the coating while limiting the temperature increase of said material to a level insufficient to deform or distort said material including the surfaces thereof; and wherein:
    said radiant heat energy is effective to heat said coating by direct radiation thereof; and
    said coated heat sensitive material has a heat reflecting layer between the coating and the heat sensitive material and said radiant heat energy is reflected away from said heat sensitive material and is effective to further heat the coating indirectly by radiant heat energy reflected back into said coating by said reflective layer.

2. A method for drying coatings on heat sensitive materials, comprising the steps of:
    subjecting the coated heat sensitive material to alternate sources of radiant heat energy and relatively cool air; and
    maintaining the time of exposure to each source and the amounts of heating and cooling of the respective sources at levels sufficient to significantly decrease the time needed to dry the coating while limiting the temperature increase of said material to a level insufficient to deform or distort said material including the surfaces thereof; and wherein:

said radiant heat energy is effective to heat said coating by direct radiation thereof; and said coating contains a colored dye absorptive of the wavelength of said radiant heat energy, and said radiant heat energy is effective to heat said coating by greater absorption into said coating.

* * * * *